United States Patent [19]

Randall et al.

[11] 3,920,439

[45] Nov. 18, 1975

[54] 2-CHLOROETHYLPHOSPHONOTHIOIC ACIDS AND ESTERS FOR REGULATION OF PLANT GROWTH

[75] Inventors: David I. Randall; Robert W. Wynn, both of Easton, Pa.

[73] Assignee: GAF Corporation, New York, N.Y.

[22] Filed: Jan. 17, 1973

[21] Appl. No.: 324,516

Related U.S. Application Data

[63] Continuation of Ser. No. 869,915, Oct. 26, 1969, abandoned.

[52] U.S. Cl.............. 71/87; 260/502.4 R; 260/961
[51] Int. Cl.²........................................... A01N 9/36
[58] Field of Search......................................... 71/87

[56] References Cited
UNITED STATES PATENTS

| | | | |
|---|---|---|---|
| 3,626,037 | 12/1971 | Randall et al............ | 71/86 |
| 3,733,192 | 5/1973 | Harris et al............... | 71/87 |
| 3,771,992 | 11/1973 | Hofer........................ | 71/87 |

Primary Examiner—Glennon H. Hollrah
Attorney, Agent, or Firm—Walter C. Kehm

[57] ABSTRACT

Compounds of the following formula:

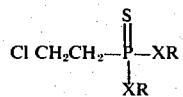

wherein X is oxygen or sulfur and R is hydrogen, alkyl, aryl, alkaryl or aralkyl, are useful as plant growth regulators when administered to plants in association with a carrier. The compounds are prepared by reaction of the 2-chloroethylphosphonic acid chloride with phosphorus pentasulfide to form 2-chloroethylphosphonothioic acid chloride and reaction of this material with water to form the acid, hydrogen sulfide to form the trithioic acid, and reaction with an alcohol or thioalcohol to form the esters.

8 Claims, No Drawings

2-CHLOROETHYLPHOSPHONOTHIOIC ACIDS AND ESTERS FOR REGULATION OF PLANT GROWTH

This is a continuation of application Ser. No. 869,915, filed Oct. 26, 1969, now abandoned.

Background of the Invention

1. Field of the Invention

This invention relates to 2-chloroethylphosphonothioic acid, its trithioic acid and esters thereof which are useful as plant growth regulators and processes for their preparation.

2. Background of the Prior Art

The art is aware that certain phosphorus-containing compounds are useful as plant growth regulators. One of the most important phosphorus compounds of this type is 2-chloroethyl phosphonic acid which has found importance as a plant growth regulator, particularly in the treatment of pineapples, soybeans and other products. According to the present invention it has been found that a new class of phosphorus compounds related to the above mentioned 2-chloroethylphosphonic acid have equivalent activity as plant growth regulators which is completely unexpected. One of the primary characteristics of products of this type resides in the presence of the 2-chloroethyl group as this is important to the plant growth stimulating activity because it is believed that the action of the compound on the plants is due to the fact that they are absorbed by the plant and release ethylene, a known plant regulator, in a form which can be used by the plant. The compounds of the present invention have now been found to have this characteristic.

While the art is aware of various phosphorus-containing compounds as being employed for plant regulators, it is apparent that a need remains in the art for compounds which have regulating activity equivalent to or better than the 2-chloroethylphosphonic acid which is the most commonly used plant regulator at the present. The present invention meets this need.

SUMMARY OF THE INVENTION

It is accordingly one object of this invention to provide a new class of compounds comprising 2-chloroethylphosphonothioic acid, 2-chloroethylphosphonotrithioic acids, their esters and thioesters.

A further object of the invention is to provide procedures for use of these compounds in the regulation of the growth of plants and procedures for application to plants.

A further object is to provide methods for the production of these 2-chloroethylphosphonothioic acids, 2-chloroethylphosphonotrithioic acids, esters and thioesters thereof from readily available materials in an economic manner.

Other objects and advantages of the present invention will become apparent as the description thereof proceeds.

In satisfaction of the foregoing objects and advantages there are provided by this invention plant growth regulators of the following formula:

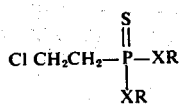

wherein X is oxygen or sulfur, and R is hydrogen, alkyl, preferably from about 1 to 5 carbon atoms, aryl of about 6 to 12 carbon atoms, preferably phenyl, alkaryl of about 7 to 15 carbon atoms, preferably tolulyl and xylyl, and aralkyl of about 7 to 15 carbon atoms, preferably benzyl. Also provided are procedures for appliciation of these materials to plants in the presence of a carrier to regulate the growth characteristics of the plants as well as chemical processes for preparation of the active compounds.

DESCRIPTION OF PREFERRED EMBODIMENTS

It has been found that the above-identified 2-chloroethylphosphonothioic acids, trithioic acids and ester derivatives thereof have unique activity as plant growth regulators and may be applied to plants such as pineapples, soybeans, tomatoes, small grains and the like to regulate growth and thereby improve crop yields. Thus these compounds may be stated to be plant growth hormones as they operate to increase yields of products of these types.

The compounds of this invention are soluble in varying degrees in water and so they can be applied to the plants in aqueous solutions composed wholly or partially of water; partial solutions include those formed of water and say acetone or methylethyl ketone. Any aqueous medium may be used provided that is is not toxic to the plant. Where any particular derivative is less water soluble it may be solubilized by the use of co-solvents and the like. Also the compounds may be absorbed on solid carriers such as vermiculite, attaclay, talc and the like for application in granular form. Dusts may also be used in which case the active ingredient will be diluted with clays or other powders, for example pyrophyllite, diatomaceous earth and attapulgite.

The compounds of this invention can be applied to the plants in any desired concentration so long as an effective amount is applied to the plants. It is preferred to apply the compound in a concentration of about one half to 10 pounds per acre or higher depending on the particular derivative used. A preferred rate of application ranges from 2 to 5 pounds per acre. The phosphonic derivatives need only be applied to the plant in low volumes of water to achieve satisfactory flower initiation and this is an important advantage of this invention. Whereas it is usually necessary to apply the known agents in large volumes of water, say on the order of 200 to 400 gallons per acre and even up to 1,000 gallons per acre in the case of ethylene to achieve flower initiation, it is possible to apply a compound of this invention in far lower volumes of water and still achieve satisfactory flower initiation. For example the compounds in this invention can be applied in 50 gallons of water at the rate of 1 pound per acre to achieve 100% flower induction on pineapples of the Smooth Cayenne variety. The ability to apply the active agent in a reduced volume of water is an important agronomic advantage because a larger acreage of plantation can be treated before recourse to a water supply is necessary, smaller equipment can be used and costs can be reduced generally.

The compounds of this invention may be prepared by the reaction of certain acid halide intermediates with appropriate reagents. A basic starting material is preferably the corresponding acid halide of the following formula:

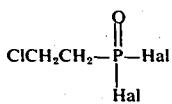

wherein Hal is a halogen and preferably chlorine.

In the first step of the process, this acid halide is reacted with phosphorus pentasulfide at a temperature of about 150°–175°C. for several hours. A molar excess of about 2:1 to 6:1 over the acid halide is generally employed. On completion of the reaction, distillation of the product will provide the 2-chloroethylphosphonothioic dihalide of the following formula:

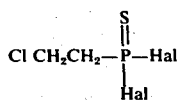

wherein Hal is as above.

This thioic dihalide is then subjected to aqueous hydrolysis by reaction with an excess of water to prepare the thioic acid where X is oxygen and R is hydrogen. This reaction is conducted by mixing the thioic dihalide with a solvent (e.g. a ketone such as acetone), adding the water and agitating while heating at about 40°–75°C. for about 1 to 5 hours. Removal of the solvent and excess water provides the 2-chloroethylphosphonothioic acid of the formula:

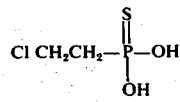

The corresponding 2-chloroethylphosphonotrithioic acid is prepared by reaction of the 2-chloroethylphosphonothioic dihalide with hydrogen sulfide in place of water.

Using the same reaction conditions the starting material is charged to the solvent and H$_2$S is passed or bubbled through at a steady rate to prepare the trithioic acid of the formula:

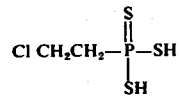

The esters and thioesters of the compounds of this invention, wherein X is O or S and R is alkyl, aryl, alkaryl or aralkyl, are obtained by the reaction of the appropriate alcohol or thioalcohol with the 2-chloroethylphosphonothioic dichloride in the presence of an organic or inorganic base which acts as an acid acceptor. Preferred alcohols or thioalcohols to be employed are of the formulae ROH or RSH and include methanol, ethanol, normal-propanol, isopropanol, normal-butanol, normal-pentanol, methylthiol, ethylthiol, n-propylthiol, n-butylthiol, phenol, thiophenol, toluol, thiotoluol, xylol, thioxylol, benzyl alcohol, benzylthiol and the like. Obviously equivalent materials may also be employed in this reaction.

As indicated this reaction is conducted in the presence of an acid acceptor such as an organic or inorganic base, suitable bases being the inorganic bases such as the alkali metal hydroxides, for example NaOH, KOH etc., alkali metal carbonates such as sodium carbonate and potassium carbonate, alkali metal bicarbonates for example NaCHO$_3$ and KHCO$_3$ as well as the alkali earth metal hydroxides, carbonates, and oxides. Organic bases may also be employed, preferably the organic amides such as the trialkyl amines, triaryl amines, heterocyclic amines, and the like including triethyl amine, trimethyl amine, pyridine and mixtures thereof. Obviously, any equivalent basic material may also be employed.

In preparation of the ester or thioester, the 2-chloroethyl phosphonothioic dichloride is charged to a solvent solution and preferably a solvent which has been dried to remove water prior to use. Preferred solvents to be employed in this aspect include diethylether, dioxane, petroleum ether, aromatic hydrocarbons, for example benzene, toluene, xylene etc., as well as mixtures thereof. After charging the thioic dichloride to the ether solution, a solvent solution containing the alcohol or thiol and acid acceptor is then added to the thioic dichloride. As two moles of alcohol or thiol are to be employed in the reaction per mole of thioic dichloride, and 2 moles of acid acceptor are also employed, the preferred molar ratio of materials of the 2-chloroethylphosphonothioic dichloride, alcohol or thiol and acid acceptor are preferably about 1:2:2, although obvious variations may be used with equivalent results.

In conducting the reaction, the above materials are charged to a suitably equipped reaction flask at a temperature of about −10°C. to +10°C. and the solution is stirred while allowing the temperature to increase slowly without the use of external heat or cooling. Generally therefore the temperature, while conducting the reaction, will range from about −10°C. to 35°C. After no further rise in temperature is noted the precipitated salt is removed by filtration and washed with the solvent employed. The resulting filtrate is then evaporated to obtain the desired product which will be found to have the following formula:

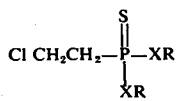

wherein X and R are as defined above.

The following examples are provided to illustrate the products and processes of the invention.

EXAMPLE I

2-Chloroethylphosphonothioic Dichloride

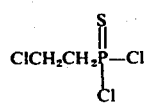

A 200 ml flask equipped with stirrer, thermometer, reflux condenser and drying tube was flushed with dry nitrogen. There was then charged 90.8 grams (0.5 mol) 2-chloroethylphosphonic dichloride and 26.7 grams (0.12 mol) phosphorus pentasulfide (Fisher Scientific Co.). The mixture was stirred and heated to 155°–160°C. for 12 hours. The resulting product was isolated by distillation from the crude mixture. There was obtained 57.1 grams of material boiling at 35°–36°C. at 0.25 mm pressure. The refractive index at 25°C. was 1.5658.

| Analysis | | Calc'd. | Found |
|---|---|---|---|
| $C_2H_4Cl_3PS$ | %S | 16.28 | 16.20; 16.15 |

EXAMPLE II

2-Chloroethylphosphonothioic Acid

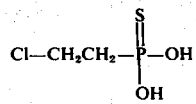

A charge of 12.0 grams (0.066 mole) 2-chloroethylphosphonothioic dichloride (from Example I), 25 ml. acetone, and 110 ml water was magnetically stirred at 50°C. for 2 hours. The water solution was then filtered from the resulting mixture to free from some cloudiness and the filtrate flash evaporated to constant weight. There was obtained 9.1 grams of product.

| Analysis | | Calc'd. | Found |
|---|---|---|---|
| $C_2H_6ClO_2PS$ | %S | 19.97 | 18.20; 18.33 |

EXAMPLE III

2-Chloroethylphosphonotrithioic Acid

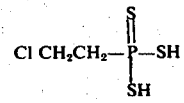

The reaction of Example II was repeated except that an excess of $H_2S$ was bubbled through the solution at 50°C. for 1 hour in place of adding water. The excess gas was then removed and the filtrate flash evaporated to recover 8.6 grams of product.

EXAMPLE IV

O,O-Dipenyl 2-Chloroethylphosphonothioate

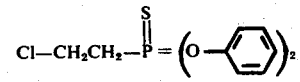

A charge of 19.8 grams (0.1 mol) 2-chloroethylphosphonothioic dichloride and 150 ml dry ether was cooled to 0°C. and 0°–5°C. There was added a solution of 18.8 grams (0.2 mol) phenol and 20.2 grams (0.2 mole) triethylamine in 150 ml dry ether.

After the addition was completed, the solution was stirred for 1 hour while the temperature slowly increased to 28°C. The precipitate triethylamine hydrochloride was removed by filtration and washed with dry ether.

The filtrate was flash evaporated to constant weight. There was obtained 29.9 grams of amber liquid product.

EXAMPLE V

Diphenyl 2-Chloroethylphosphonotrithioate

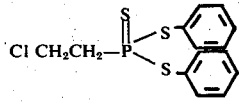

There was charged 19.8 grams (0.1 mol) 2-chloroethylphosphonothioic dichloride and 150 ml dry ether. At 0°–5°C. there was added a solution of 22.0 grams (0.2 mol) thiophenol and 20.2 grams (0.2 mol) triethylamine in 150 ml dry ether. After stirring one hour while warming to room temperature the triethylamine hydrochloride was filtered off and washed with dry ether. Flash evaporation of the filtrate yielded 33.9 grams of product melting at 54°–62°C. One recrystallization from methyl alcohol gave 24.2 grams of white crystals; m.p. 64°–66.5°C.

The products and processes have been described herein with reference to certain preferred embodiments but it is to be understood that variations thereon will become obvious to those skilled in the art.

What is claimed is:

1. A crop yield improving composition comprising an effective amount of a compound of the formula:

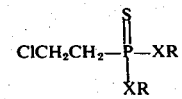

wherein X is oxygen or sulfur and R is hydrogen, $C_{1-5}$ alkyl, phenyl optionally substituted by methyl, or benzyl, and a non-phytotoxic carrier therefor.

2. A composition as defined in claim 1 wherein R is hydrogen or phenyl.

3. A composition as defined in claim 1 wherein said carrier is selected from the group consisting of water, partial solutions of water and a water miscible solvent, solid carriers and dusts.

4. A composition as defined in claim 1 wherein said carrier is an aqueous medium.

5. A composition as defined in claim 1 wherein said carrier is a solid material.

6. A method for improving the yield of crop plants which comprises applying thereto an effective amount of a composition as defined in claim 1.

7. A method as defined in claim 6 wherein said composition is applied at a rate of about 0.5 to 10 lbs. of said compound per acre of plants.

8. A method as defined in claim 6 wherein said plants are pineapples, soybeans, tomatoes or small grains.

* * * * *